(Model.)

J. R. JONES.
Collar Pad.

No. 240,144.

Patented April 12, 1881.

Attest:
R. F. Barnes.
S. W. Luly

Inventor:
John R. Jones
by Ellis Spear
Attorney

N. PETERS, PHOTO-LITHOGRAPHER, WASHINGTON, D. C.

UNITED STATES PATENT OFFICE.

JOHN R. JONES, OF CLARKSVILLE, IOWA.

COLLAR-PAD.

SPECIFICATION forming part of Letters Patent No. 240,144, dated April 12, 1881.

Application filed March 5, 1881. (Model.)

*To all whom it may concern:*

Be it known that I, JOHN R. JONES, of Clarksville, in the county of Butler and State of Iowa, have invented a new and useful Improvement in Collar-Pads; and I do hereby declare that the following is a full, clear, and exact description of the same.

My invention is an adjustable collar-pad. Its object is to provide means whereby a collar may be adjusted within certain limits to the size of the horse on which it is used.

It consists in making the pad expansible and fitting it to be placed between the neck of the horse and the collar-straps or withers of the collar, whereby the collar is held up in proper position, said position being regulated by the amount of expansion given to the pad.

Figure 1:
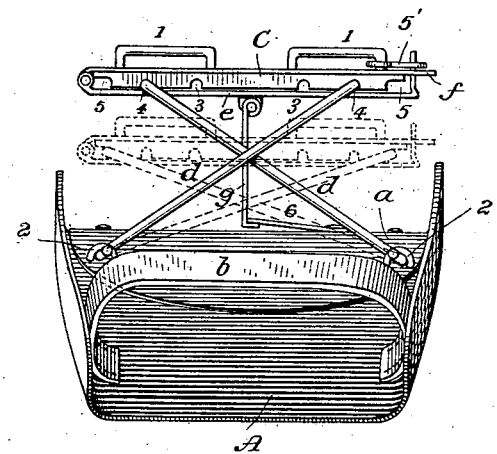
Figure 2:
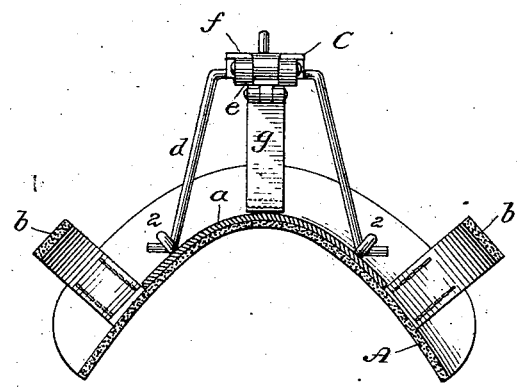

In the accompanying drawings, Figure 1 represents the pad in side elevation. Fig. 2 shows a transverse central section thereof.

As constructed, the adjustable or expansible pad is adapted to be applied to an ordinary collar at the withers. The saddle part A is fitted to rest directly upon the neck of the horse. It may be made of leather, with a strengthening metal plate, $a$, on its upper surface, or it may be made wholly of stiff leather or wholly of metal, as may be found cheaper or more desirable by the manufacturer. On each side are straps $b\ b$, by which the pad is connected to the collar, said straps encircling the limb of the collar and being secured either by a buckle or by stitching. The bar $c$ rests directly against the under side of the withers or straps of the collar. If straps are used, they may pass through the loops 1 1 on the top of said bar, or the said bar may be made to fit up against the upper bow of the collar, so that said upper bow shall rest thereon. It will plainly appear that when the upper bow (or straps) of the collar is resting on the bar $c$, if the said bar is raised by the interposition of an expansible support between the bar $c$ and the saddle-piece A resting on the neck of the horse, the collar will be raised a distance equal to the height of the piece so interposed. Various means might be provided thus to separate these two parts and raise the collar.

I have shown a simple and convenient construction of parts, which consists of braces $d\ d$, pivoted at their lower ends, one at the front and one at the rear of the saddle-piece A. The pivoting is shown at 2 2. These braces $d\ d$ act as supports for the bar $c$. Their free ends are in the form of a loop slightly tapering to the end, which is formed with a straight transverse part. This part is adapted to fit into notches 3 4 5 in the bar $c$. The notches are in sets, three of each set being arranged at equal distances from the center of the bar. It is clear, as shown in dotted lines in Fig. 1, that when the transverse ends of the braces are in the notches 5—that is, those nearest the ends—the bar $c$ is in its lowest position, or that required when the collar most nearly fits the horse. When, however, the bar is raised the braces $d\ d$ are moved to bring their ends nearer each other till they fall into the notches 4 4, the bar being raised higher and the pad fitted for a larger size of collar for the same animal.

The third set of notches, 3 3, give the bar its highest elevation. These notches are in the under side of the bar, and the braces are held in them by means of a movable strap, $e$, hinged on one end of the bar $c$, and connected to the other by a spring-catch, 5, which locks into the upturned end of strap $e$, said end passing through a hole in the upper strengthening-plate, $f$.

Any other suitable locking devices may be used, and other means for securing the links to the bar $c$.

A hinged post, $g$, is attached to the lower side of the bar $c$, adapted to rest on the saddle-piece when the links are in notches 4, and to lend support to said braces when most inclined. Its lower end is bent at right angles, and rests against a spring-stop, 6, on the saddle-piece.

Having described my invention, I claim—

1. The combination of the saddle-piece, the straps $b\ b$, the vertically-adjustable bar $c$, and the braces $d\ d$, fitting in notches in said bar.

2. The combination of the saddle-piece, the braces $d\ d$, the notched bar $c$, and the hinged strap $e$.

3. The combination of the saddle-piece, the vertically-adjustable bar $c$, the braces, the post $g$, and its stop, substantially as described and shown.

In testimony whereof I have signed my name to this specification in the presence of two subscribing witnesses.

JOHN R. JONES.

Witnesses:
BECK WAMSLEY,
IKE E. LUCAS.